United States Patent
Wang et al.

(10) Patent No.: US 12,482,291 B2
(45) Date of Patent: Nov. 25, 2025

(54) PEDESTRIAN ATTRIBUTE RECOGNITION METHOD BASED ON A PEDESTRIAN ATTRIBUTE RECOGNITION SYSTEM AND METHOD FOR TRAINING THE SAME

(71) Applicant: BOE TECHNOLOGY GROUP CO., LTD., Beijing (CN)

(72) Inventors: Tingting Wang, Beijing (CN); Zhanfu An, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/005,379

(22) PCT Filed: Nov. 12, 2021

(86) PCT No.: PCT/CN2021/130421
§ 371 (c)(1),
(2) Date: Jan. 13, 2023

(87) PCT Pub. No.: WO2023/082196
PCT Pub. Date: May 19, 2023

(65) Prior Publication Data
US 2024/0249547 A1    Jul. 25, 2024

(51) Int. Cl.
*G06V 10/00*    (2022.01)
*G06V 10/44*    (2022.01)
(Continued)

(52) U.S. Cl.
CPC ............ *G06V 40/10* (2022.01); *G06V 10/44* (2022.01); *G06V 10/771* (2022.01);
(Continued)

(58) Field of Classification Search
CPC ............ G06N 3/02; G06N 3/08; G06N 3/082; G06N 3/092; G06N 3/0454; G06N 3/0475;
(Continued)

(56) References Cited

U.S. PATENT DOCUMENTS 8,456,327 B2 * 6/2013 Bechtel ................ G06V 10/147
                                                    348/297
11,003,892 B2 * 5/2021 Li ........................ G06V 10/806
(Continued)

FOREIGN PATENT DOCUMENTS

CN     110705474 A    1/2020
CN     111738074 A    10/2020
(Continued)

OTHER PUBLICATIONS

Feng et al., "WO2019041360A1 Pedestrian attribute recognition and positioning method and convolutional neural network system"; Publication Date: Mar. 7, 2019.*
(Continued)

*Primary Examiner* — Amir Alavi
(74) *Attorney, Agent, or Firm* — Dority & Manning, P.A.

(57) ABSTRACT

A pedestrian attribute recognition method based on a pedestrian attribute recognition system is provided, and the system includes at least one attribute localization module. Each attribute localization module corresponds to a plurality of pedestrian attributes; and the attribute localization module includes a spatial transformation unit and an attribute recognition unit. The method includes: extracting, by the spatial transformation unit, feature information in a discriminable region from feature information input into the spatial transformation unit, the discriminable region being related to the plurality of pedestrian attributes corresponding to the attribute localization module; and outputting, by the attribute recognition unit, recognition results of the plurality of pedestrian attributes corresponding to the attribute localization module according to the feature information in the discriminable region.

19 Claims, 7 Drawing Sheets

(51) Int. Cl.
*G06V 10/77* (2022.01)
*G06V 10/771* (2022.01)
*G06V 10/774* (2022.01)
*G06V 10/80* (2022.01)
*G06V 10/82* (2022.01)
*G06V 40/10* (2022.01)

(52) U.S. Cl.
CPC ........ *G06V 10/7715* (2022.01); *G06V 10/774* (2022.01); *G06V 10/806* (2022.01); *G06V 10/82* (2022.01)

(58) Field of Classification Search
CPC ...... G06N 3/0464; G06N 3/042; G06N 3/045; G06N 3/047; G06V 10/82; G06V 10/7715; G06V 10/806; G06V 10/771; G06V 10/454; G06V 10/44; G06V 10/774; G06V 40/10; G06V 40/103; G06F 18/00
See application file for complete search history.

(56) References Cited

U.S. PATENT DOCUMENTS

| | | | | |
|---|---|---|---|---|
| 11,157,727 B2* | 10/2021 | Hu | ................ | G06V 10/82 |
| 11,195,028 B2* | 12/2021 | Lee | ................ | G06V 10/60 |
| 11,210,537 B2* | 12/2021 | Koivisto | ................ | G06N 3/044 |
| 11,508,049 B2* | 11/2022 | Seo | ................ | G06F 18/217 |
| 11,906,660 B2* | 2/2024 | Wekel | ................ | G06F 18/25 |
| 11,928,183 B2* | 3/2024 | Sun | ................ | G06V 10/776 |
| 12,188,779 B2* | 1/2025 | Shekar | ................ | G01C 21/3819 |
| 2016/0188967 A1* | 6/2016 | Chang | ................ | G06V 10/50 348/148 |
| 2020/0272902 A1 | 8/2020 | Feng et al. | | |
| 2024/0249547 A1* | 7/2024 | Wang | ................ | G06V 40/10 |

FOREIGN PATENT DOCUMENTS

| | | |
|---|---|---|
| CN | 112507978 A | 3/2021 |
| CN | 112800978 A | 5/2021 |
| CN | 113239820 A | 8/2021 |

OTHER PUBLICATIONS

International Search Report (with English translation) and Written Opinion for corresponding PCT Application No. PCT/CN2021/130421, dated Aug. 10, 2022, 9 pages.

Tang et al., "Improving Pedestrian Attribute Recognition with Weakly-Supervised Multi-Scale Attribute-Specific Localization", 2019 IEEE/CVF International Conference on Computer Vision, Oct. 2019, 12 pages.

* cited by examiner

PEDESTRIAN ATTRIBUTE RECOGNITION METHOD BASED ON A PEDESTRIAN ATTRIBUTE RECOGNITION SYSTEM AND METHOD FOR TRAINING THE SAME

CROSS-REFERENCE TO RELATED APPLICATION

This application is a national phase entry under 35 USC 371 of International Patent Application No. PCT/CN2021/130421 filed on Nov. 12, 2021, which is incorporated herein by reference in its entirety.

TECHNICAL FIELD

The present disclosure relates to the technical field of intelligent recognition, and in particular, to a pedestrian attribute recognition method based on a pedestrian attribute recognition system and a method for training the same.

BACKGROUND

Pedestrian attribute recognition refers to predicting and analyzing various attribute information related to pedestrians in images by using a computer. Common pedestrian attribute recognition includes recognizing macroscopic attributes of pedestrians such as gender, skin color, age and posture, and recognizing specific character attributes of the pedestrians such as backpack type, clothing type and color, trousers type and color, and current action. An accurate and efficient pedestrian attribute recognition method is helpful for all kinds of analysis work based on pedestrian images, and the pedestrian attribute recognition is more and more widely used in various fields. At present, the pedestrian attribute recognition may be applied to many fields such as video surveillance, smart city, public security and precise advertising. The pedestrian attribute recognition has become an important research direction in the field of computer vision.

SUMMARY

In an aspect, a pedestrian attribute recognition method based on a pedestrian attribute recognition system is provided, the system includes at least one attribute localization module. Each attribute localization module corresponds to a plurality of pedestrian attributes, and the attribute localization module includes a spatial transformation unit and an attribute recognition unit. The method includes: extracting, by the spatial transformation unit, feature information in a discriminable region from feature information input into the spatial transformation unit, and the discriminable region is related to the plurality of pedestrian attributes corresponding to the attribute localization module; and outputting, by the attribute recognition unit, recognition results of the plurality of pedestrian attributes corresponding to the attribute localization module according to the feature information in the discriminable region.

In some embodiments, extracting, by the spatial transformation unit, feature information in the discriminable region from the feature information input into the spatial transformation unit, includes: determining, by the spatial transformation unit, transformation parameters of the discriminable region according to the feature information input into the spatial transformation unit; and extracting, by the spatial transformation unit, the feature information in the discriminable region from the feature information input into the spatial transformation unit according to the transformation parameters of the discriminable region. The transformation parameters include a scaling transformation parameter in a horizontal direction, a scaling transformation parameter in a vertical direction, a translation transformation parameter in the horizontal direction and a translation transformation parameter in the vertical direction.

In some other embodiments, the attribute localization module further includes a channel attention unit. The method includes: calibrating, by the channel attention unit, feature information input into the channel attention unit to obtain calibrated feature information. The calibrated feature information is used as the feature information input into the spatial transformation unit.

In yet some other embodiments, calibrating, by the channel attention unit, the feature information input into the channel attention unit to obtain the calibrated feature information, includes: passing, by the channel attention unit, the feature information input into the channel attention unit through a global average pooling layer, a 1×1 convolutional layer, a rectified linear unit (ReLU) activation layer, another 1×1 convolutional layer and a sigmoid activation layer sequentially to obtain a first calibration vector; multiplying, by the channel attention unit, the first calibration vector and the feature information input into the channel attention unit channel by channel to obtain a second calibration vector; and adding, by the channel attention unit, the second calibration vector and the feature information input into the channel attention unit element by element to obtain the calibrated feature information.

In yet some other embodiments, the at least one attribute localization module includes a first attribute localization module and a second attribute localization module. The method includes: recognizing, by the first attribute localization module, pedestrian attributes related to human body parts, and recognizing, by the second attribute localization module, pedestrian attributes related to an entire human body.

In yet some other embodiments, the first attribute localization module includes one or more of a head attribute localization module, an upper body attribute localization module or a lower body attribute localization module. Recognizing, by the first attribute localization module, the pedestrian attributes related to the human body parts, includes: recognizing, by the head attribute localization module, pedestrian attributes related to a head of the human body, recognizing, by the upper body attribute localization module, pedestrian attributes related to an upper body of the human body, and recognizing, by the lower body attribute localization module, pedestrian attributes related to a lower body of human body.

In yet some other embodiments, the pedestrian attribute recognition system further includes a feature extraction module.

The feature extraction module includes P feature extraction layers, where P is an integer greater than 1. The method further includes: passing, by the feature extraction module, a pedestrian image through the P feature extraction layers sequentially to extract P pieces of feature information at different levels, and a single piece of feature information corresponds to one feature extraction layer. The feature information input into the spatial transformation unit is from a piece of feature information extracted by the feature extraction module.

In yet some other embodiments, the pedestrian attribute recognition system further includes a feature fusion module. The method further includes: performing, by the feature fusion module, a fusion processing on the P pieces of feature information at different levels extracted by the feature extraction module to obtain P pieces of fusion-processed feature information. The feature information input into the spatial transformation unit is from a piece of fusion-processed feature information output by the feature fusion module.

In yet some other embodiments, the at least one attribute localization module includes a plurality of attribute localization modules, the plurality of attribute localization modules are divided into P groups of attribute localization modules, and each group of attribute localization modules includes K attribute localization modules, where K is an integer greater than 1 and less than M and M is an integer greater than 1. A group of attribute localization modules corresponds to one piece of fusion-processed feature information. The method further includes: outputting, by the group of attribute localization modules, a first pedestrian attribute prediction vector according to the corresponding piece of fusion-processed feature information, and the first pedestrian attribute prediction vector including recognition results of M pedestrian attributes.

In yet some other embodiments, the pedestrian attribute recognition system further includes a feature recognition module. The method further includes: outputting, by the feature recognition module, a second pedestrian attribute prediction vector according to a piece of feature information at a highest level extracted by the feature extraction module, the second pedestrian attribute prediction vector including recognition results of the M pedestrian attributes.

In yet some other embodiments, the pedestrian attribute recognition system further includes a result output module. The method further includes: outputting, by the result output module, final recognition results of the M pedestrian attributes according to first pedestrian attribute prediction vectors output by the P groups of attribute localization modules and the second pedestrian attribute prediction vector output by the feature recognition module.

In some other embodiments, the final recognition results of the M pedestrian attributes are final predicted probability values of the M pedestrian attributes.

In some other embodiments, the final recognition results of the M pedestrian attributes are final tag values of the M pedestrian attributes.

In another aspect, a method for training a pedestrian attribute recognition system is provided. The method includes: obtaining a training sample set including a plurality of sample pedestrian images, each sample pedestrian image having a corresponding attribute tag, the attribute tag being used to indicate a pedestrian attribute existing in a corresponding sample pedestrian image; and training the pedestrian attribute recognition system according to the training sample set, so as to obtain a trained pedestrian attribute recognition system. The trained pedestrian attribute recognition system is the pedestrian attribute recognition system described in any of the above embodiments.

In yet another aspect, a training device is provided, and the device includes a memory and a processor. The memory is coupled to the processor. The memory is used to store computer program code, and the computer program code includes computer instructions. When the processor executes the computer instructions, the computer instructions cause the training device to perform the training method provided by the above embodiments.

In yet another aspect, a recognition device is provided, and the device includes a memory and a processor. The memory is coupled to the processor. The memory is used to store computer program code, and the computer program code includes computer instructions. When the processor executes the computer instructions, the computer instructions cause the recognition device to perform the pedestrian attribute recognition method provided by the above embodiments.

In yet another aspect, a non-transitory computer-readable storage medium is provided, and the computer-readable storage medium has stored a computer program that, when run on a training device, causes the training device to perform the training method provided by the above embodiments; or when run on a recognition device, causes the recognition device to perform the pedestrian attribute recognition method provided by the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, but are not limitations on actual sizes of products, actual processes of methods, and actual timings of signals involved in the embodiments of the present disclosure.

DETAILED DESCRIPTION

Figure 1:
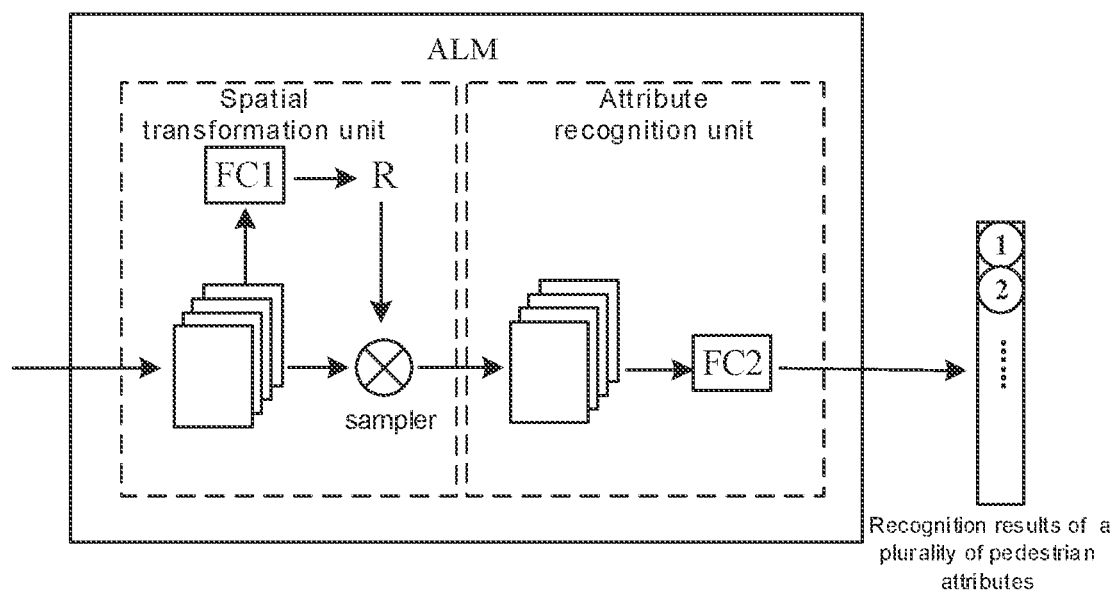
FIG. 1 is a structural diagram of an attribute localization module (ALM), in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to". In the description of the specification, the term such as "one embodiment," "some embodiments," "exemplary embodiments," "example." "specific example" or "some examples" is intended to indicate that specific features, structures, materials or characteristics related to the embodiment(s) or example(s) are included in at least one embodiment or example of the present disclosure. Schematic representation of the above term does not necessarily refer to the same embodiment(s) or example(s). In addition, the specific features, structures, materials or characteristics may be included in any one or more embodiments or examples in any suitable manner.

Hereinafter, the terms such as "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, unless otherwise specified, the term "a plurality of/the plurality of" means two or more.

In the description of some embodiments, the terms "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "A and/or B" includes the following three combinations: only A, only B, and a combination of A and B.

As used herein, the term "if" is optionally construed to mean "when" or "in a case where" or "in response to determining" or "in response to detecting", depending on the context. Similarly, depending on the context, the phrase "if it is determined that" or "if [a stated condition or event] is detected" is optionally construed as "in a case where it is determined that", "in response to determining that", "in a case where [the stated condition or event] is detected", or "in response to detecting [the stated condition or event]".

In addition, the phrase "based on" or "according to" used is meant to be open and inclusive, since a process, step, calculation or other action that is "based on" or "according to" one or more of the stated conditions or values may, in practice, be based on additional conditions or values exceeding those stated.

For ease of understanding, basic concepts of some terms or technologies involved in embodiments of the present disclosure are briefly introduced and described first.

1. Deep Learning (DL)

Deep learning is a general term of a class of pattern analysis methods. The deep learning enables a machine to have an ability to analyze and learn like humans. By learning inherent laws and representation levels of sample data, the machine may recognize data such as texts, images and sounds.

2. Convolutional Neural Network (CNN)

The convolutional neural network is a type of feedforward neural network including convolution calculation and having a deep structure, and is one of representative algorithms of the deep learning. The convolutional neural network may be applied to computer vision, such as image recognition, object recognition, action recognition, pose estimation and neural style transfer, and may also be applied to natural language processing (NLP).

In general, the convolutional neural network includes an input layer, a hidden layer and an output layer.

The input layer of the convolutional neural network may process multi-dimensional data. Image processing is taken as an example, and the input layer may receive pixel values (three-dimensional arrays) of an image. The pixel value includes two-dimensional pixel points on a plane and values of RGB channels.

The hidden layer of the convolutional neural network includes one or more convolutional layers, one or more pooling layers, and one or more fully-connected layers. A function of the convolutional layer is to perform feature extraction on input data. The convolutional layer is generally followed by the pooling layer such that after the convolutional layer performs the feature extraction, output data are transmitted to the pooling layer for selection and information filtering. Each node of the fully-connected layer is connected to all nodes of a previous layer, so as to integrate obtained features. The fully-connected layer functions as a "classifier" in an entire convolutional neural network.

The output layer of the convolutional neural network has the same structure and working principle as an output layer of a traditional feedforward neural network. For example, as for a convolutional neural network for graph classification, the output layer uses a logistic function or a softmax function to output classification tags, such as people, sceneries and objects. As for a convolutional neural network for pedestrian attribute recognition, the output layer may be designed to output pedestrian attributes of pedestrian images.

3. Spatial Transformer Network (STN)

The STN model is one of the most basic recognition models in a field of affine transformation. Through the STN model, distortion transformation operations such as translation, scaling and rotation may be performed on an input original image, so that the original image may be converted into a preset mode to facilitate better recognition. The STN model consists of three parts, i.e., a parameter prediction module, a coordinate mapping module and a pixel acquisition module. The parameter prediction module is used to calculate affine transformation parameters representing a spatial transformation of the original image and a transformed image. The coordinate mapping module is used to determine coordinate points of both the original image and the transformed image. The pixel acquisition module is used to determine the transformed image. In practical applications, the STN model is generally placed at an initial recognition position to improve classification accuracy. For example, the STN model may transform a received image by the following formula 1:

$$\begin{pmatrix} x_i^s \\ y_i^s \end{pmatrix} = \begin{bmatrix} s_x & 0 & t_x \\ 0 & s_y & t_y \end{bmatrix} \begin{pmatrix} x_i^t \\ y_i^t \\ 1 \end{pmatrix};  \qquad (1)$$

where $s_x$ and $s_y$ are scaling parameters; $t_x$ and $t_y$ are translation parameters; $(x_i^s, y_i^s)$ and $(x_i^t, y_i^t)$ are an original coordinate of an i-th pixel in the received image and a coordinate of an i-th pixel in the transformed image, respectively.

4. Squeeze and Excitation Network (SE Net)

The SE Net is essentially a channel-based attention model, which is modeled according to dependencies between channels. The SE Net may allocate different weights to feature channels according to importance degrees of the feature channels, and may also adaptively increase or decrease weights for different channels according to different task purposes. In a practical application process, the SE Net model may selectively enhance features with a large amount of information, so that these features may be fully utilized and useless features may be suppressed in subsequent processing.

5. Activation Function

The activation function is used to enable an artificial neural network to have nonlinear modeling capability. In a case where a network does not have an activation function, the network can only express a linear mapping, and the entire network is equivalent to a single-layer neural network. Only in a case where the activation function is added, does the neural network have the ability to learn nonlinear mapping of different layers. For a linearly separable data set, a classification problem may be solved by only using a linear classifier. However, in a specific classification process, actual data are often not linearly separable. In this case, the activation function may be introduced to solve the classification problem of nonlinear data.

The sigmoid function is a type of activation function with the widest application range, which has a form of the exponential function. The sigmoid function is closest to a biological neuron in physical sense; and it is a common sigmoid function in biology, which is also referred to as a sigmoid growth curve. The sigmoid function has a wide application in logistic regression and the artificial neural network. A formula form of the sigmoid function is the following formula (2):

$$S(t) = \frac{1}{1+e^{-t}}. \qquad (2)$$

The linear rectification function is also referred to as a rectified linear unit (ReLU). The linear rectification function is a commonly-used activation function in the artificial neural network, and generally refers to a nonlinear function represented by a ramp function and its variant, which belongs to a nonlinear activation function. The linear rectification function may simulate a more accurate activation model of brain neuron receiving signals from a biological perspective. A formula form of the ramp function is the following formula (3):

$$f(x) = \max(0, x). \qquad (3)$$

The above is an introduction to technical terms involved in the embodiments of the present disclosure, which will not be repeated below.

As described in the background, a research work of a pedestrian attribute recognition technology has an extremely high value in academic research and industrial application. In practical applications, requirements for recognition accuracy and recognition efficiency of the pedestrian attribute recognition technology are both high. Existing pedestrian attribute recognition algorithms based on deep learning mainly include a "global" algorithm and a "local" algorithm.

The "global" algorithm regards a pedestrian attribute recognition problem as a multi-label classification problem, generally uses the convolutional neural network to extract required features from an entire pedestrian image, and uses a fully-connected layer at a top of the network to predict pedestrian attributes based on the extracted features.

The "local" algorithm pays more attention to some local regions that are important for classification prediction in an input image. A human pose estimation model is pre-trained to predict human key points of the input image, and then a head, an upper body, a lower body or other local regions of a human body are roughly located according to these key points, so as to divide the pedestrian image into images of different local regions (such as a head region, an upper body region and a lower body region). The images of different local regions are input into pre-trained pedestrian attribute recognition models corresponding to the local regions respectively, so as to recognize pedestrian attributes corresponding to an image of a local region.

However, the pedestrian attribute recognition algorithms have a low accuracy. In this regard, a pedestrian attribute recognition system based on an attribute localization module (ALM) is provided in the related art. In the related art, a single ALM corresponds to one pedestrian attribute, and the ALM is able to adaptively recognize a local feature corresponding to the pedestrian attribute in a pedestrian image, and recognize the pedestrian attribute according to the local feature. Therefore, the accuracy and efficiency of recognizing the pedestrian attribute may be improved.

In the related art, a single ALM corresponds to only one pedestrian attribute. If M pedestrian attributes need to be recognized in the pedestrian image, the pedestrian attribute recognition system provided in the related art needs to include at least M ALMs. For example, if pedestrian attributes such as hairstyle, gender, and clothing need to be recognized in a pedestrian image, the pedestrian attribute recognition system provided in the related art includes at least an ALM for hairstyle recognition, an ALM for gender recognition, and an ALM for clothing recognition. In this way, the pedestrian attribute recognition system provided in the related art includes a large number of ALMs, which results in a long running time of the entire system.

In light of this, embodiments of the present disclosure provide a pedestrian attribute recognition system including at least one ALM. Each ALM corresponds to a plurality of pedestrian attributes. In this way, for the same number of pedestrian attributes that need to be recognized, the number of ALMs required by the pedestrian attribute recognition system may be effectively reduced, thereby reducing a running time of the pedestrian attribute recognition system. Therefore, the pedestrian attribute recognition system may be better applied to various fields of life and production.

In the embodiments of the present disclosure, if M pedestrian attributes need to be recognized by the pedestrian attribute recognition system, the M pedestrian attributes may be divided into K types, and a type of pedestrian attributes may include the plurality of pedestrian attributes. M is an integer greater than 1, and K is an integer greater than 1 and less than M. Therefore, in the pedestrian attribute recognition system, a single ALM corresponds to one type of pedestrian attributes.

In a possible implementation, the M pedestrian attributes may be divided into pedestrian attributes related to human body parts and pedestrian attributes related to an entire human body. For example, the pedestrian attributes related to the human body parts may include whether to wear glasses, hairstyle, clothing, etc. The pedestrian attributes related to the entire human body may include age, height, gender, etc. Based on this, the pedestrian attribute recognition system may include a first ALM and a second ALM. The first ALM is used to recognize the pedestrian attributes related to the human body parts. The second ALM is used to recognize the pedestrian attributes related to the entire human body.

Furthermore, the pedestrian attributes related to the human body parts may be further subdivided. For example, they may be further divided into pedestrian attributes related to the head, pedestrian attributes related to the upper body, and/or pedestrian attributes related to the lower body. For example, the pedestrian attributes related to the head may include whether to wear glasses, hairstyle, etc. The pedestrian attributes related to the upper body may include the type of clothing worn on the upper body, whether to carry a backpack, etc. The pedestrian attributes related to the lower body may include the type of clothing worn on the lower body, the type of boots, etc. Accordingly, the first ALM may include one or more of a head ALM, an upper body ALM, and a lower body ALM. The head ALM is used to recognize the pedestrian attributes related to the head of the human body. The upper body ALM is used to recognize the pedestrian attributes related to the upper body of the human body. The lower body ALM is used to recognize the pedestrian attributes related to the lower body of the human body.

Alternatively, the pedestrian attributes related to the human body parts may be, for example, further subdivided into pedestrian attributes related to the head, pedestrian attributes related to the hands, pedestrian attributes related to the torso and/or pedestrian attributes related to the legs. Accordingly, the first ALM may include one or more of a head ALM, a hand ALM, a torso ALM or a leg ALM. The head ALM is used to recognize the pedestrian attributes related to the head of the human body. The hand ALM is used to recognize the pedestrian attributes related to the hands of the human body. The torso ALM is used to recognize the pedestrian attributes related to the torso of the human body. The leg ALM is used to recognize the pedestrian attributes related to the legs of the human body.

In another possible implementation, the M pedestrian attributes may be divided into pedestrian attributes related to clothing, pedestrian attributes related to actions, pedestrian attributes related to appearance, etc. For example, the pedestrian attributes related to the clothing may include the type of clothing worn on the upper body, the type of clothing worn on the lower body, the type of shoes, a color of clothing worn on the upper body, a color of clothing worn on the lower body, a color of shoes, etc. The pedestrian attributes related to the actions may include pedestrian actions such as running, jumping and walking. The pedestrian attributes related to the appearance may include height, age, gender, etc. Accordingly, the pedestrian attribute recognition system provided in the embodiments of the present disclosure may include a clothing attribute localization module, an appearance attribute localization module, an action attribute localization module, etc. The clothing attribute localization module is used to recognize the pedestrian attributes related to the clothing. The appearance attribute localization module is used to recognize the pedestrian attributes related to the appearance. The action attribute localization module is used to recognize the pedestrian attributes related to the actions.

It will be understood that, the division of the M pedestrian attributes is merely exemplary. The pedestrian attributes in a pedestrian image that needs to be recognized by the pedestrian attribute recognition system may vary according to actual needs. Accordingly, the division of the M pedestrian attributes may also vary according to actual needs.

Optionally, the division of the M pedestrian attributes may be implemented by using a clustering algorithm or a deep learning method. Thus, a plurality of pedestrian attributes with an implicit association relationship may be divided into the same type. In this way, even if a single ALM is used to recognize a type of pedestrian attributes, it is possible to achieve purposes of reducing a computation amount and improving a recognition speed while ensuring the recognition accuracy.

A structure of the ALM provided in the embodiments of the present disclosure will be described below.

As shown in FIG. 1, the ALM provided in the embodiments of the present disclosure includes a spatial transformation unit and an attribute recognition unit. The spatial transformation unit is connected to the attribute recognition unit. An output of the spatial transformation unit is an input of the attribute recognition unit.

The spatial transformation unit is used to extract feature information in a discriminable region from feature information input into the spatial transformation unit. The discriminable region is related to the plurality of pedestrian attributes corresponding to the ALM.

The attribute recognition unit is used to output recognition results of the plurality of pedestrian attributes corresponding to the ALM according to the feature information in the discriminable region.

In an example, a recognition result of a pedestrian attribute may be a predicted probability value of the pedestrian attribute. The predicted probability value of the pedestrian attribute may be a value of a probability that the pedestrian attribute exists in the pedestrian image. For example, a predicted probability value of a pedestrian attribute A is 65%, which indicates that a probability that the pedestrian attribute A exists in the pedestrian image is 65%.

In another example, the recognition result of the pedestrian attribute may be a tag value of the pedestrian attribute. For example, the pedestrian attribute A is a binary-classification pedestrian attribute. That a tag value of the pedestrian attribute A is 1 indicates that the pedestrian attribute A exists in the pedestrian image; that the tag value of the pedestrian attribute A is 0 indicates that the pedestrian attribute A does not exist in the pedestrian image. It will be understood that a meaning represented by the tag value of the pedestrian attribute may be determined according to actual situations, which is not limited in the embodiments of the present disclosure.

Optionally, in a case where the recognition result of the pedestrian attribute may be the tag value of the pedestrian attribute, the attribute recognition unit may determine a predicted probability value of each pedestrian attribute in the plurality of pedestrian attributes corresponding to the ALM according to the feature information in the discriminable region; then, the predicted probability value of each pedestrian attribute is compared with a probability threshold value corresponding to each pedestrian attribute, and the tag value of each pedestrian attribute is determined based on the comparison result.

The pedestrian attribute A is taken as an example, and the attribute recognition unit may determine that the predicted probability value of the pedestrian attribute A is 65% according to the feature information in the discriminable region; then the attribute recognition unit compares the predicted probability value 65% of the pedestrian attribute A with a corresponding probability threshold value 50%, and determines that the predicted probability value of the pedestrian attribute A is greater than the probability threshold value. Therefore, the attribute recognition unit determines that the tag value of the pedestrian attribute A is a tag value for indicating that the pedestrian attribute A exists in the pedestrian image.

It will be understood that probability threshold values corresponding to different pedestrian attributes may be different. For example, a probability threshold value corresponding to the pedestrian attribute A is 50%, and a probability threshold value corresponding to a pedestrian attribute B is 65%. The probability threshold value corresponding to the pedestrian attribute may be determined according to an algorithm such as the deep learning, which will not be repeated.

It will be understood that in a practical application process of the convolutional neural network, locality, translation invariance, reduction invariance, rotation invariance of an input sample are generally required to be considered, so as to improve the accuracy of classifying the input sample. These methods actually perform spatial coordinate transformation on an image. The spatial transformation unit may perform spatial transformation on various deformation data, so that it may transform the input into a desired form of a next layer of the network. The spatial transformation unit may also be trained to automatically select features in an interested region (i.e., the feature information in the discriminable region) in an actual recognition process.

For the pedestrian attributes corresponding to the attribute localization module, the discriminable region is a semantic region of the pedestrian attributes in the pedestrian image; and the feature information in the discriminable region is feature information useful for recognizing the pedestrian attributes. Therefore, compared with an algorithm for recognizing pedestrian attributes based on a global feature, the ALM in the embodiments of the present disclosure may recognize the pedestrian attributes based on a local feature (i.e., the feature information in the discriminable region), thereby reducing the calculation amount and improving the accuracy and the efficiency of pedestrian attribute recognition.

In some embodiments, the spatial transformation unit may employ a STN technology. In this case, the spatial transformation unit is used to: determine transformation parameters of the discriminable region according to the feature information input into the spatial transformation unit; extract the feature information in the discriminable region from the feature information input into the spatial transformation unit according to the transformation parameters of the discriminable region. The transformation parameters include a scaling transformation parameter in a horizontal direction, a scaling transformation parameter in a vertical direction, a translation transformation parameter in the horizontal direction and a translation transformation parameter in the vertical direction.

It will be understood that the scaling transformation parameter in the horizontal direction, the scaling transformation parameter in the vertical direction, the translation transformation parameter in the horizontal direction and the translation transformation parameter in the vertical direction are combined to determine a rectangular bounding box, i.e., to determine a boundary of the discriminable region.

For example, as shown in FIG. 1, the spatial transformation unit employing the STN technology may include a first fully-connected layer FC1 and a sampler. After the feature information input into the spatial transformation unit passes through the first fully-connected layer FC1, the transformation parameters are obtained; then, after a matrix R formed by the transformation parameters and the feature information input into the spatial transformation unit pass through the sampler, the feature information in the discriminable region is obtained.

The sampler performs a Kronecker product operation on the matrix R and the feature information input into the spatial transformation unit to obtain the feature information in the discriminable region.

In some embodiments, as shown in FIG. 1, the attribute recognition unit may be constructed with a second fully-connected layer FC2 and a classification function (not shown in FIG. 1). The number of output neurons of the second fully-connected layer FC2 is the same as the number of pedestrian attributes corresponding to the attribute recognition unit. The attribute recognition unit is used to: input the feature information in the discriminable region into the second fully-connected layer FC2 to obtain a feature vector output by the second fully-connected layer FC2; then input the feature vector output by the second fully-connected layer FC2 into the classification function to obtain the recognition results of the pedestrian attributes output by the classification function. In a case where a pedestrian attribute is a binary-classification pedestrian attribute, the activation function may use the sigmoid function; and in a case where the pedestrian attribute is a multi-classification pedestrian attribute, the activation function may use the softmax function. For convenience of description, the pedestrian attribute in the embodiments of the present disclosure is the binary-classification pedestrian attribute. It will be understood that the multi-classification pedestrian attribute may also be converted into a plurality of binary-classification pedestrian attributes for processing.

Figure 2:
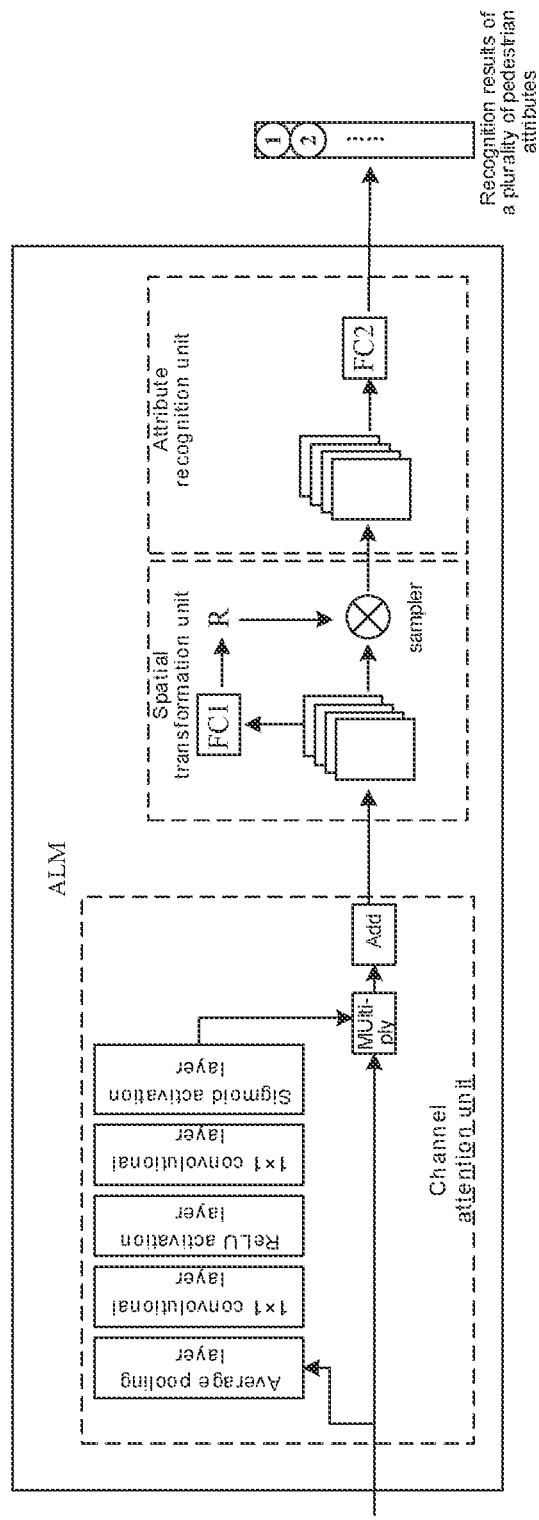
FIG. 2 is a structural diagram of another ALM, in accordance with some embodiments.

Optionally, as shown in FIG. 2, the ALM provided in embodiments of the present disclosure may further include a channel attention unit. The channel attention unit is connected to the spatial transformation unit. An output of the channel attention unit is the input of the spatial transformation unit.

The channel attention unit is used to calibrate feature information input into the channel attention unit by using a channel attention mechanism, so as to obtain calibrated feature information.

It will be noted that an attention mechanism is a mechanism that focuses on local information, such as a certain image region in an image. However, as a task objective changes, an attention region also tends to change. A salient object detection comes along with the attention mechanism. An input of the salient object detection is a graph and an output of the salient object detection is a probability graph. The higher probability a position has, the higher the probability that the position is an important target in the image is. For a CNN that a two-dimensional image is input into, one dimension of the feature information is a scale space of the image, i.e., a length and width of the image, and the other dimension of the feature information is a feature dimension of the image, including feature channels. Therefore, the channel attention mechanism may be used to automatically obtain an importance degree of each feature channel by means of learning; then according to importance degrees, useful features are promoted and features that are not useful for a current task are suppressed (that is, the feature information is calibrated).

In the embodiments of the present disclosure, the ALM adds the channel attention unit, which may realize calibration of the feature information input into the spatial transformation unit, so as to promote a part of the feature information that is useful for recognizing the plurality of pedestrian attributes corresponding to the ALM, and to suppress a part of the feature information that is useless for recognizing the plurality of pedestrian attributes corresponding to the ALM, thereby improving the accuracy of pedestrian attribute recognition.

In some embodiments, the channel attention unit may employ the SE net. As shown in FIG. 2, the channel attention unit may include a global average pooling layer, a 1×1 convolutional layer, a ReLU activation layer, another 1×1 convolutional layer, a sigmoid activation layer, a multiplier and an adder. The channel attention unit is used to: pass the feature information input into the channel attention unit through the global average pooling layer, the 1×1 convolutional layer, the ReLU activation layer, the another 1×1 convolutional layer and the sigmoid activation layer sequentially to obtain a first calibration vector; multiply the first calibration vector and the feature information input into the channel attention unit channel by channel to obtain a second calibration vector; and add the second calibration vector and the feature information input into the channel attention unit element by element to output the calibrated feature information.

Optionally, the pedestrian attribute recognition system provided in embodiments of the present disclosure further includes a feature extraction module. The feature extraction module is used to extract feature information from a pedestrian image input into the pedestrian attribute recognition system.

It will be understood that the embodiments of the present disclosure do not limit a resolution and the number of channels of the feature information extracted by the feature extraction module.

Optionally, the feature extraction module may include P feature extraction layers, where P is a positive integer greater than 1. The feature extraction module is used to pass the pedestrian image through the P feature extraction layers sequentially to extract P pieces of feature information at different levels. A single piece of feature information corresponds to one feature extraction layer.

That is, different feature extraction layers are used to extract feature information at different levels. The closer a feature extraction layer is to an input of the pedestrian attribute recognition system, the lower a level of the feature information extracted by the feature extraction layer is; and the closer a feature extraction layer is to an output of the pedestrian attribute recognition system, the higher a level of the feature information extracted by the feature extraction layer is.

Optionally, the feature extraction module may employ a batch normalization (BN)-inception architecture, or other CNN architecture. In a case where the feature extraction module employs the BN-inception architecture, each feature extraction layer in the feature extraction module may include at least one inception block. For a specific structure of the inception block, reference may be made to the related art, which will not be repeated here.

Figure 3:
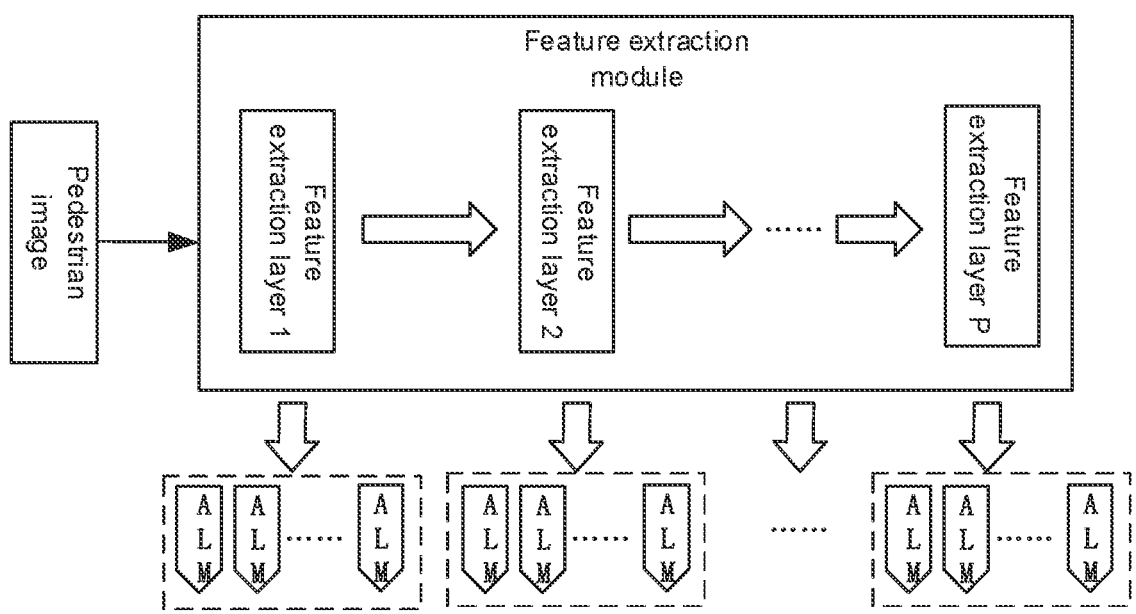
FIG. 3 is a structural diagram of a pedestrian attribute recognition system, in accordance with some embodiments.

In some embodiments, the feature information extracted by the feature extraction module may be directly used as feature information input into the ALM(s). Based on this, as shown in FIG. 3, in a case where the feature extraction module includes P feature extraction layers, at least one ALM includes a plurality of ALMs, the plurality of ALMs may be divided into P groups of ALMs, and each group of ALMs includes ALMs. A group of ALMs corresponds to one feature extraction layer.

For example, if P is equal to 3 (P=3), the pedestrian attribute recognition system includes 12 ALMs, which may be divided into 3 groups. A first group of ALMs includes ALM1-1, ALM1-2, ALM1-3 and ALM1-4. A second group of ALMs includes ALM2-1, ALM2-2, ALM2-3 and ALM2-4. A third group of ALMs includes ALM3-1, ALM3-2, ALM3-3 and ALM3-4. ALM1-1, ALM2-1 and ALM3-1 may all be ALMs for recognizing the pedestrian attributes related to the head of human body. ALM1-2, ALM2-2 and ALM3-2 may all be ALMs for recognizing the pedestrian attributes related to the upper body of human body. ALM1-3, ALM2-3 and ALM3-3 may all be ALMs for recognizing the pedestrian attributes related to the lower body of human body. ALM1-4, ALM2-4 and ALM3-4 may all be ALMs for recognizing the pedestrian attributes related to the entire human body.

For a group of ALMs, feature information input into the group of ALMs may be feature information extracted by a feature extraction layer corresponding to the group of ALMs. And the group of ALMs is used to output a first pedestrian attribute prediction vector, and the first pedestrian attribute prediction vector includes recognition results of M pedestrian attributes of the pedestrian image.

In some other embodiments, the feature information extracted by the feature extraction module also needs to undergo a series of processing (e.g., a fusion processing), and the processed feature information is used as the feature information input into the ALM.

Figure 4:
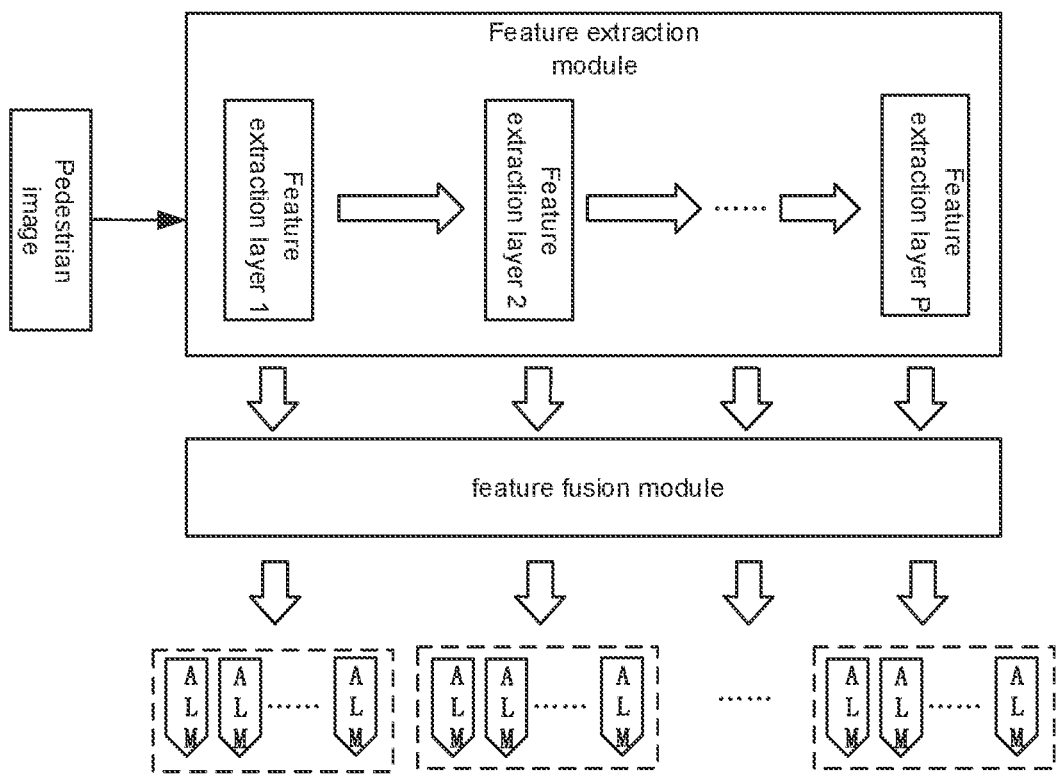
FIG. 4 is a structural diagram of another pedestrian attribute recognition system, in accordance with some embodiments.

Optionally, as shown in FIG. 4, the pedestrian attribute recognition system provided in embodiments of the present disclosure further includes a feature fusion module. The feature fusion module is used to perform a fusion processing on the P pieces of feature information at different levels extracted by the feature extraction module, so as to output P pieces of fusion-processed feature information.

Optionally, both the feature extraction module and the feature fusion module may employ an architecture of a feature pyramid network. Based on this, as a possible implementation, the feature extraction module is used to: directly take feature information extracted by a P-th feature extraction layer as a P-th piece of fusion-processed feature information; and perform a fusion processing on feature information extracted by an i-th feature extraction layer in the rest (P−1) feature extraction layer(s) and a (i+1)-th piece of fusion-processed feature information, so as to obtain an i-th piece of fusion-processed feature information, where i is an integer greater than or equal to 1 and less than or equal to P−1, and (i+1) takes its value from P.

For example, the fusion processing may include the following operations. The (i+1)-th piece of fusion-processed feature information is up-sampled to obtain up-sampled feature information; then the up-sampled feature information is spliced with the feature information extracted by the i-th feature extraction layer according to the number of channels to obtain the i-th piece of fusion-processed feature information.

A purpose of the up-sampling is to make a resolution of feature information extracted by a (i+1)-th feature extraction layer be the same as a resolution of the feature information extracted by the i-th feature extraction layer. Therefore, a magnification used for the up-sampling mainly considers the resolution of the feature information extracted by the i-th feature extraction layer and the resolution of the feature information extracted by the (i+1)-th feature extraction layer. For example, the resolution of the feature information extracted by the i-th feature extraction layer is 16×8, and the resolution of the feature information extracted by the (i+1)-th feature extraction layer is 8×4; and thus the magnification used for the up-sampling is 2.

In some embodiments, the plurality of ALMs included in the pedestrian attribute recognition system may be divided into the P groups of ALMs, and each group of ALMs includes the ALMs. Feature information input into an i-th group of ALMs is the i-th piece of fusion-processed feature information.

For a group of ALMs, the group of ALMs is used to output the first pedestrian attribute prediction vector, and the first pedestrian attribute prediction vector includes the recognition results of the M pedestrian attributes of the pedestrian image.

It will be understood that, for an image, low-level feature information has more detailed information, and high-level feature information has more semantic information. The low-level feature information and the high-level feature information complement each other. The feature information input into the ALM is the fusion-processed feature information, which is beneficial for ALM to make use of advantages of the high-level feature information and the low-level feature information to improve the accuracy of pedestrian attribute recognition.

Figure 5:
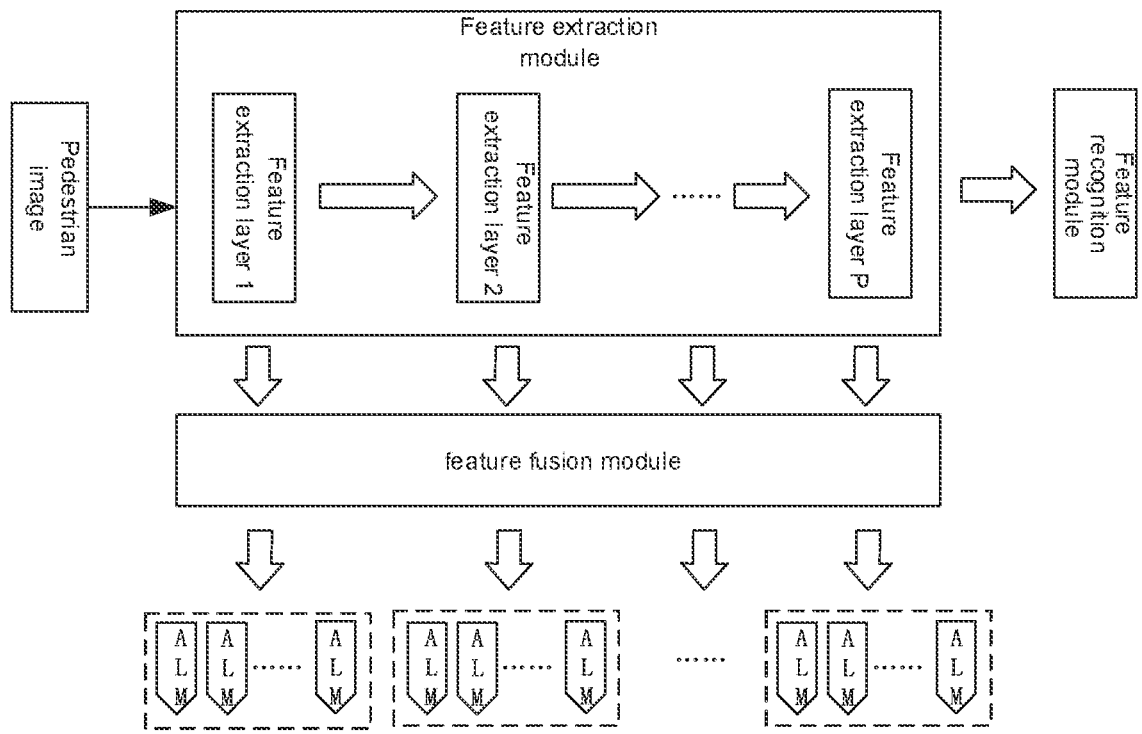
FIG. 5 is a structural diagram of yet another pedestrian attribute recognition system, in accordance with some embodiments.

Optionally, as shown in FIG. 5, the pedestrian attribute recognition system provided in embodiments of the present disclosure may further include a feature recognition module. The feature recognition module is connected to the feature extraction module. The feature recognition module is used to obtain a second pedestrian attribute prediction vector according to feature information at a highest level extracted by the feature extraction module. The second pedestrian attribute prediction vector includes recognition results of the M pedestrian attributes of the pedestrian image.

Optionally, the feature recognition module may be constructed with a third fully-connected layer and a classification function. The feature recognition module is used to input the feature information at the highest level extracted by the feature extraction module into the third fully-connected layer to obtain a feature vector output by the third fully-connected layer; then the feature vector output by the third fully-connected layer is input into the classification function, so as to obtain the second pedestrian attribute prediction vector output by the classification function.

It will be understood that, the feature recognition module makes use of global features to recognize pedestrian attributes, and the ALM makes use of local features to recognize pedestrian attributes. In this way, the pedestrian attribute recognition system provided in the embodiments of the present disclosure can make full use of advantages of the two recognition methods to improve the accuracy of pedestrian attribute recognition.

Figure 6:
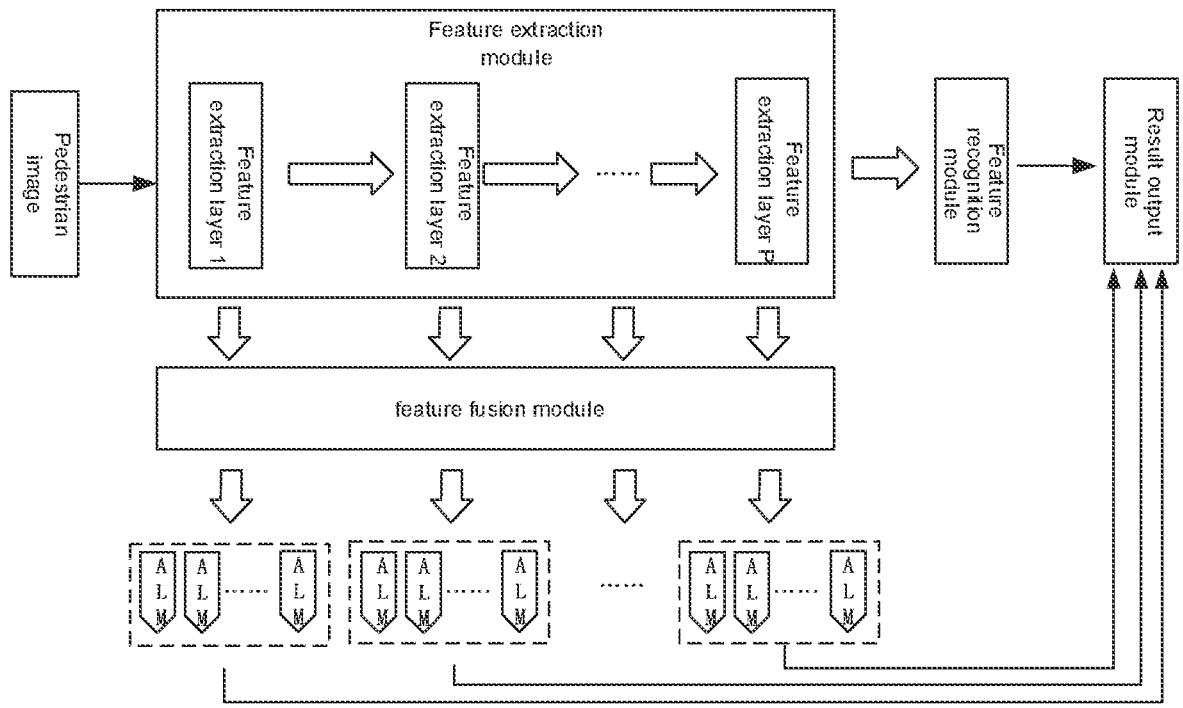
FIG. 6 is a structural diagram of yet another pedestrian attribute recognition system, in accordance with some embodiments.

Optionally, as shown in FIG. 6, in a case where the pedestrian attribute recognition system provided in the embodiments of the present disclosure includes at least one group of ALMs and the feature recognition module, the pedestrian attribute recognition system provided in the embodiments of the present disclosure may further include a result output module.

The result output module is used to output final recognition results of the M pedestrian attributes of the pedestrian image according to first pedestrian attribute prediction vectors output by all groups of ALMs and the second pedestrian attribute prediction vector output by the feature recognition module.

In an example, a final recognition result of a pedestrian attribute may be a final predicted probability value of the pedestrian attribute.

In another example, the final recognition result of the pedestrian attribute may be a final tag value of the pedestrian attribute.

A processing flow of the result output module is described below by taking an example in which the recognition result of the pedestrian attribute included in a pedestrian attribute prediction vector is a predicted probability value of the pedestrian attribute, and the final recognition result of the pedestrian attribute is the final tag value of the pedestrian attribute.

For a target pedestrian attribute, the result output module selects a maximum predicted probability value as a final predicted probability value of the target pedestrian attribute from predicted probability values of the target pedestrian attribute included in all first pedestrian attribute prediction vectors and a predicted probability value of the target pedestrian attribute included in the second pedestrian attribute prediction vector. The target pedestrian attribute may be any one of the M pedestrian attributes needing to be recognized in the pedestrian image.

Then, the result output module determines whether the final predicted probability value of the target pedestrian attribute is greater than or equal to a probability threshold value corresponding to the target pedestrian attribute. If the final predicted probability value of the target pedestrian attribute is greater than or equal to the probability threshold value corresponding to the target pedestrian attribute, the result output module determines that a final tag value of the target pedestrian attribute is a tag value for indicating that the target pedestrian attribute exists in the pedestrian image; on the contrary, the result output module determines that the final tag value of the target pedestrian attribute is a tag value for indicating that the target pedestrian attribute does not exist in the pedestrian image.

For example, the pedestrian attribute recognition system includes three groups of ALMs and the feature recognition module. For the pedestrian attribute A, a predicted probability value of the pedestrian attribute A included in the first pedestrian attribute prediction vector output by a first group of ALMs is 60%; a predicted probability value of the pedestrian attribute A included in the first pedestrian attribute prediction vector output by a second group of ALMs is 62%; a predicted probability value of the pedestrian attribute A included in the first pedestrian attribute prediction vector output by a third group of ALMs is 65%; and a predicted probability value of the pedestrian attribute A included in the second pedestrian attribute prediction vector output by the feature recognition module is 40%. Based on this, the result output module may determine that a final predicted probability value of the pedestrian attribute A is 65%.

If a probability threshold value corresponding to the pedestrian attribute A is 50%, in the case where the final predicted probability value of the pedestrian attribute A is 65%, it may be determined that the pedestrian image includes the pedestrian attribute A.

A processing flow of the result output module is described below by taking an example in which the recognition result of the pedestrian attribute included in a pedestrian attribute prediction vector is a tag value of the pedestrian attribute, and the final recognition result of the pedestrian attribute is the final tag value of the pedestrian attribute.

For the target pedestrian attribute, the result output module counts the number of occurrences of each tag value of the target pedestrian attribute according to tag values of the target pedestrian attribute in all first pedestrian attribute prediction vectors and a tag value of the target pedestrian attribute in the second pedestrian attribute prediction vector. Thus, the result output module may select a tag value with the highest number of occurrences as the final tag value of the target pedestrian attribute.

For example, the pedestrian attribute recognition system includes three groups of ALMs and the feature recognition module. For the pedestrian attribute A, a tag value of the pedestrian attribute A included in the first pedestrian attribute prediction vector output by a first group of ALMs is 1; a tag value of the pedestrian attribute A included in the first pedestrian attribute prediction vector output by a second group of ALMs is 1; a tag value of the pedestrian attribute A included in the first pedestrian attribute prediction vector output by a third group of ALMs is 1; and a tag value of the pedestrian attribute A included in the second pedestrian attribute prediction vector output by the feature recognition module is 0. Thus, the result output module may determine that the final tag value of the pedestrian attribute A is 1.

It will be understood that, the above description of the processing flow in which the result output module determines the final recognition result of the pedestrian attribute is merely exemplary, and other methods may also be used in practical applications, which are not limited thereto.

The pedestrian attribute recognition system provided in the embodiments of the present disclosure may include not only an attribute localization module for recognizing pedestrian attributes, but also an attribute localization module for recognizing one pedestrian attribute, which is not limited here.

A working process of the pedestrian attribute recognition system provided in the embodiments of the present disclosure will be specifically described below with reference to specific examples.

Figure 7:
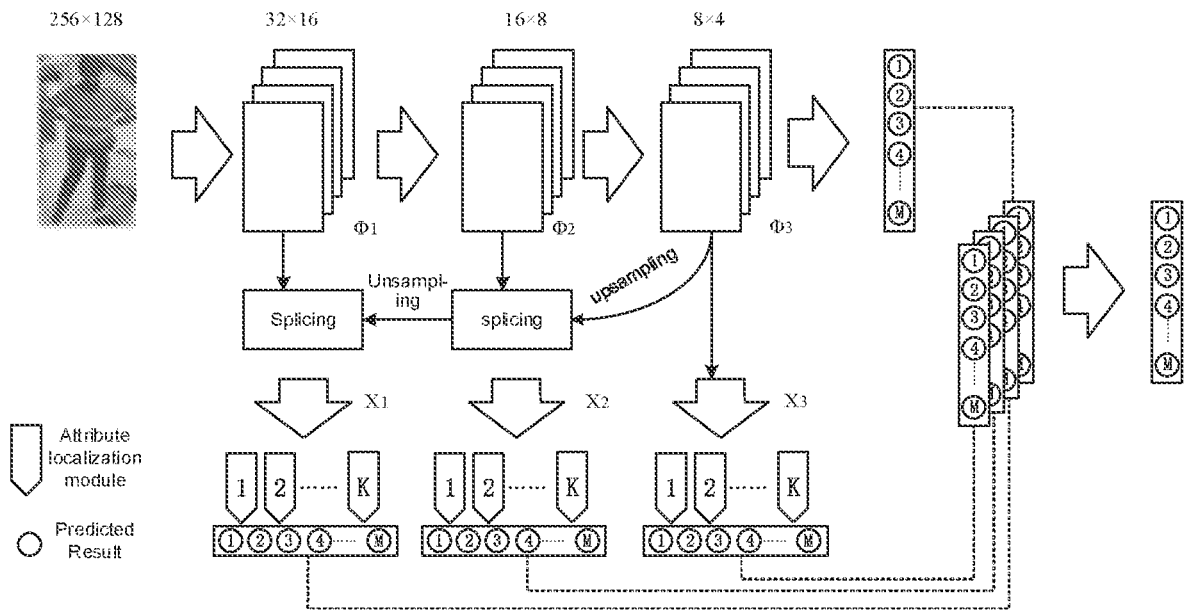
FIG. 7 is a schematic diagram showing a pedestrian attribute recognition process, in accordance with some embodiments.

As shown in FIG. 7, a pedestrian image with a preset resolution may be input into the pedestrian attribute recognition system provided in the embodiments of the present disclosure. For example, the preset resolution may be 256× 128.

The pedestrian image with the preset resolution passes through three feature extraction layers in the feature extraction module successively to obtain three pieces of feature information $ø_1$, $ø_2$ and $ø_3$ at different levels. For example, a resolution of feature information $ø_1$ may be 32×16, a resolution of feature information $ø_2$ may be 16×8, and a resolution of feature information $ø_3$ may be 8×4. And the number of channels of each of the three pieces of feature information $ø_1$, $ø_2$ and $ø_3$ may be 256.

After the three pieces of feature information $ø_1$, $ø_2$ and $ø_3$ are processed by the feature fusion module, three pieces of fusion-processed feature information $X_1$, $X_2$ and $X_3$ may be obtained; where $X_3$ is $ø_3$; $X_2$ is obtained by splicing up-sampled $X_3$ and 02 according to the number of channels; and X, is obtained by splicing up-sampled $X_2$ and $ø_1$ according to the number of channels.

A resolution of feature information $X_3$ is 8×4 and the number of channels thereof is 256. A resolution of feature information $X_2$ is 16×8 and the number of channels thereof is 512. A resolution of feature information $X_1$ is 32×16 and the number of channels thereof is 768.

The feature information $X_1$ is input into the first group of ALMs to obtain a pedestrian attribute prediction vector $L_1$. The feature information $X_2$ is input into the second group of ALMs to obtain a pedestrian attribute prediction vector $L_2$. The feature information $X_3$ is input into the third group of ALMs to obtain a pedestrian attribute prediction vector $ø_3$. The three groups of ALMs each include KALMs.

The feature information $ø_3$ is also input into the feature recognition module to obtain a pedestrian attribute prediction vector $\mathcal{L}_4$.

The pedestrian attribute prediction vectors $\mathcal{L}_1$, $\mathcal{L}_2$, $\mathcal{L}_3$ and $\mathcal{L}_4$ each include recognition results of M pedestrian attributes.

Finally, the pedestrian attribute recognition system inputs the pedestrian attribute prediction vectors $\mathcal{L}_1$, $\mathcal{L}_2$, $\mathcal{L}_3$ and $\mathcal{L}_4$ into the result recognition module to obtain recognition results of the pedestrian image, i.e., to obtain final recognition results of the M pedestrian attributes.

The description of the pedestrian attribute recognition system provided in the embodiments of the present disclosure is merely exemplary, and the pedestrian attribute recognition system may include more or fewer modules. Moreover, some modules in the pedestrian attribute recognition system may be integrated together, or some modules each may be divided into more modules.

It will be understood that, the pedestrian attribute recognition system provided in the embodiments of the present disclosure may be implemented in software, hardware or a combination of software and hardware. In a case where the pedestrian attribute recognition system is implemented in software, the pedestrian attribute recognition system may be referred to as a pedestrian attribute recognition model. In a case where the pedestrian attribute recognition system is implemented in hardware or the combination of software and hardware, the pedestrian attribute recognition system may be implemented by a processor.

For example, the processor may be a general-purpose logic operation device with data processing capability and/or program execution capability, such as a central processing unit (CPU), a graphics processing unit (GPU), a microcontroller unit (MCU). The processor executes computer instructions of corresponding functions to implement the corresponding functions. Computer instructions include one or more processor operations defined by an instruction set architecture corresponding to the processor, and these computer instructions may be logically contained and represented by one or more computer programs.

For example, the processor may be a hardware entity having functions that may be programmed and adjusted to perform corresponding functions, such as a field programmable gate array (FPGA) or an application specific integrated circuit (ASIC). For example, the processor may be a hardware circuit specifically designed to perform corresponding functions, such as a tensor processing unit (TPU) or a neural-network processing unit (NPU).

Figure 8:
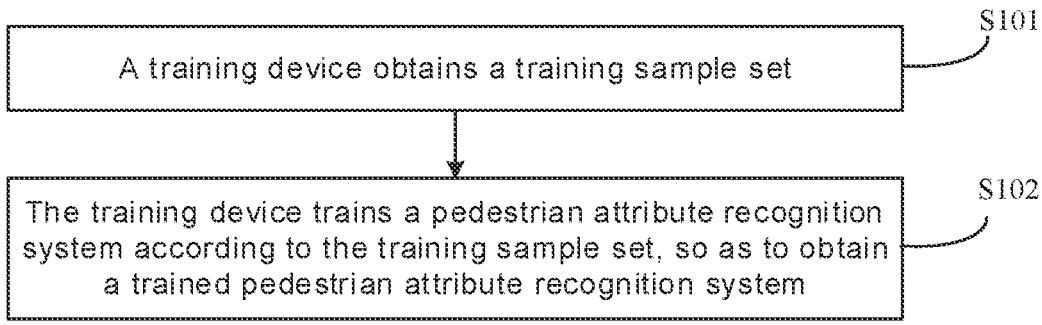
FIG. 8 is a flow diagram of a training method, in accordance with some embodiments.

As shown in FIG. 8, embodiments of the present disclosure provide a training method, which is used to obtain the pedestrian attribute recognition system by training, and the method includes the following steps.

In S101, a training device obtains a training sample set.

The training sample set includes a plurality of sample pedestrian images. Each sample pedestrian image has been preset with a corresponding attribute tag.

Optionally, the attribute tag may be in the following form: $y=[y^1, y^2, \ldots, y^M]$; where M is the number of pedestrian attributes needing to be recognized. $y^m \in [0, 1]$, $m \in [1, 2, \ldots, M]$; where $y^m = 0$, which indicates that the pedestrian image does not include the pedestrian attribute; and $y^m=1$, which indicates that the pedestrian image includes the pedestrian attribute.

For example, Table 1 shows a specific example of pedestrian attributes needing to be recognized in the pedestrian image. It will be understood that, in actual use, pedestrian attributes needing to be recognized in the pedestrian image may be more or fewer than the pedestrian attributes in the example of Table 1.

TABLE 1

| Serial number | Pedestrian attribute |
| --- | --- |
| 1 | Black hair |
| 2 | Blue hair |
| 3 | Brown hair |
| 4 | White hair |
| 5 | Male |
| 6 | Female |
| 7 | Wearing glasses |
| 8 | Wearing a T-shirt on the upper body |
| 9 | Wearing jeans on the lower body |
| 10 | Carrying a backpack |

According to Table 1, if an attribute tag of a certain pedestrian image is [1, 0, 0, 0, 1, 0, 1, 1, 1, 1], it is indicated that pedestrian attributes included in the pedestrian image are: black hair, male, wearing glasses, wearing a T-shirt on the upper body, wearing jeans on the lower body, and carrying a backpack.

In S102, the training device trains a pedestrian attribute recognition system according to the training sample set, so as to obtain a trained pedestrian attribute recognition system.

As a possible implementation, the training device may input each sample pedestrian image in the training sample set into the pedestrian attribute recognition system, so as to train all modules (e.g., the ALM, the feature extraction module and the feature recognition module) in the pedestrian attribute recognition system.

The training device may use a preset loss function to determine a loss value corresponding to the pedestrian attribute recognition system according to recognition results of sample pedestrian images by the pedestrian attribute recognition system and attribute tags of the sample pedestrian images. Then, the training device uses a gradient descent algorithm to update the pedestrian attribute recognition system according to the loss value of the pedestrian attribute recognition system. It will be understood that updating the pedestrian attribute recognition system refers to updating parameters (e.g., weight values and bias values) of the pedestrian attribute recognition system. For example, the preset loss function may be a binary-classification cross-entropy loss function.

A calculation process of the loss value of the pedestrian attribute recognition system will be described below with reference to FIG. 7.

The loss value of the pedestrian attribute recognition system may be a sum of loss values corresponding to all groups of ALMs and a loss value corresponding to the feature recognition module. For example, $L=L_1+L_2+L_3+L_4$; where L represents the loss value of the pedestrian attribute recognition system, $L_1$ represents a loss value corresponding to the first group of ALMs, $L_2$ represents a loss value corresponding to the second group of ALMs, $L_3$ represents a loss value corresponding to the third group of ALMs, and $L_4$ represents the loss value corresponding to the feature recognition module.

$L_1$, $L_2$, $L_3$ and $L_4$ each may satisfy the following formula:

$$L_i = -\frac{1}{M}\sum_{m=1}^{M}\gamma^m(y^m\log(\delta(\hat{y}_i^m)) + (1-y^m)\log(1-\delta(\hat{y}_i^m))).$$

Where M is the number of pedestrian attributes needing to be recognized; $y^m$ is a tag value of a m-th pedestrian attribute; $\hat{y}_i^m$ is a predicted probability value of the m-th pedestrian attribute; $\gamma^m$ is a weight of the m-th pedestrian attribute; and $\delta$ is a preset parameter.

After the pedestrian attribute recognition system is iteratively trained to achieve convergence, the training device may obtain the trained pedestrian attribute recognition system.

Optionally, after completing the training, the training device may further verify the trained pedestrian attribute recognition system, so as to avoid over-fitting occurring in the trained pedestrian attribute recognition system.

Based on the embodiments shown in FIG. 8, only the attribute tag of the sample pedestrian image is required in the training process, and there is no need to mark a region corresponding the pedestrian attribute in the sample pedestrian image. That is, the embodiments of the present disclosure may accomplish the training of the pedestrian attribute recognition system in a weakly supervised manner to reduce complexity of the training. Moreover, the trained pedestrian attribute recognition system includes at least one ALM, and a single ALM may correspond to a plurality of pedestrian attributes. That is, the single ALM may determine recognition results of the plurality of pedestrian attributes through one calculation. In this way, an overall calculation amount of the pedestrian attribute recognition system may be effectively reduced, thereby reducing time taken to obtain the recognition results corresponding to the pedestrian image.

Figure 9:
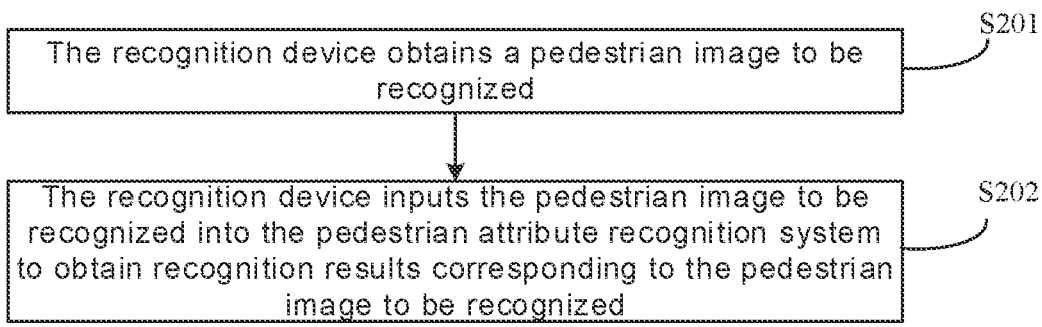
FIG. 9 is a flow diagram of a recognition method, in accordance with some embodiments.

As shown in FIG. 9, embodiments of the present disclosure provide an attribute recognition method based on the pedestrian attribute recognition system, and the method includes the following steps.

In S201, a recognition device obtains a pedestrian image to be recognized.

Optionally, the pedestrian image to be recognized may be a frame of image in a video. For example, the video may be a surveillance video shot by a security camera.

In S202, the recognition device inputs the pedestrian image to be recognized into the pedestrian attribute recognition system to obtain recognition results corresponding to the pedestrian image to be recognized.

In an example, the recognition results corresponding to the pedestrian image to be recognized are used to indicate predicted probability values of M pedestrian attributes in the pedestrian image to be recognized. It will be understood that, in the case where the pedestrian attribute recognition system includes the result output module, the predicted probability values indicated by the recognition results are final predicted probability values output by the result output module.

In another example, the recognition results corresponding to the pedestrian image to be recognized are used to indicate pedestrian attributes existing in the pedestrian image to be recognized. Optionally, the recognition results corresponding to the pedestrian image to be recognized include tag values of M pedestrian attributes. It will be understood that, in the case where the pedestrian attribute recognition system includes the result output module, the tag values of the pedestrian attributes included in the recognition results are final tag values output by the result output module.

Optionally, the pedestrian image to be recognized may be preprocessed firstly, so that the preprocessed pedestrian image meets input requirements (e.g., requirements for a size of an image) of the pedestrian attribute recognition system; then, the preprocessed pedestrian image is input into the pedestrian attribute recognition system. The preprocessing may include a size normalization processing.

For a process in which the pedestrian attribute recognition system processes the pedestrian image to be recognized, reference may be made to the foregoing, and details will not be repeated here.

Based on the embodiments shown in FIG. 9, the pedestrian attribute recognition system provided in the embodiments of the present disclosure includes at least one ALM, and a single ALM may correspond to a plurality of pedestrian attributes. Therefore, based on the recognition method of the pedestrian attribute recognition system provided in the embodiments of the present disclosure, calculation amount for recognizing pedestrian attributes of the pedestrian image may be reduced, thereby reducing time taken to obtain the recognition results corresponding to the pedestrian image.

In the embodiments of the present disclosure, the recognition device and the training device may be two separate devices, or may be integrated into one device. In a case where the recognition device and the training device are two separate devices, the recognition device may obtain the trained pedestrian attribute recognition system from the training device.

Optionally, the recognition device and the training device may be servers or terminal devices.

The server may be a device with data processing capability and data storage capability. For example, the server may be one server, or a server cluster composed of a plurality of servers, or a cloud computing service center, which is not limited here.

The terminal device may be a mobile phone, a tablet computer, a handheld computer, a notebook computer, an ultra-mobile personal computer (UMPC), a netbook, a personal digital assistant (PDA), an augmented reality (AR) device or virtual reality (VR) device.

The foregoing describes solutions provided in the embodiments of the present disclosure mainly from a method perspective. In order to realize the above functions, the solutions include corresponding hardware structures and/or software modules for performing various functions. Those skilled in the art will readily realize that embodiments of the present disclosure may be implemented in hardware or a combination of hardware and computer software in combination with units and algorithm steps in examples described in the embodiments disclosed herein. Whether a function is performed in hardware or in a manner in which computer software drives hardware depends on specific application and design constraints of the technical solution. Professional and technical staff may implement the described functions in different ways for each specific application, but such implementations should not be interpreted as being beyond the protection scope of the present disclosure.

Figure 10:
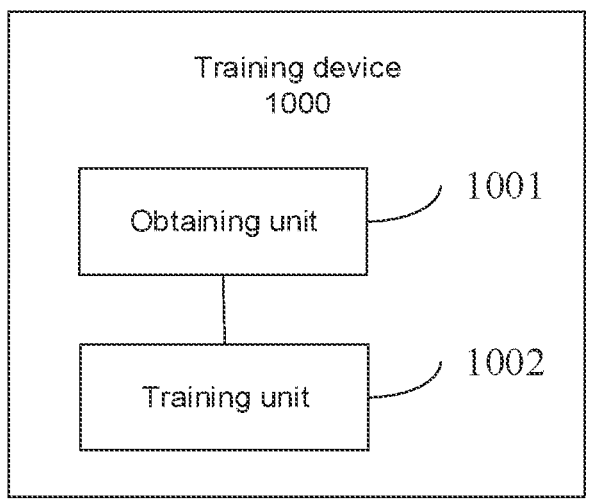
FIG. 10 is a structural diagram of a training device, in accordance with some embodiments.

Some embodiments of the present disclosure provide a training device. As shown in FIG. 10, the training device 1000 includes an obtaining unit 1001 and a training unit 1002.

The obtaining unit 1001 is used to obtain a training sample set including a plurality of sample pedestrian images. Each sample pedestrian image has a corresponding attribute tag, and the attribute tag is used to indicate a pedestrian attribute existing in the corresponding sample pedestrian image.

The training unit 1002 is used to train a pedestrian attribute recognition system according to the training sample set, so as to obtain a trained pedestrian attribute recognition system; and the trained pedestrian attribute recognition system is any pedestrian attribute recognition system provided in the above embodiments.

Figure 11:
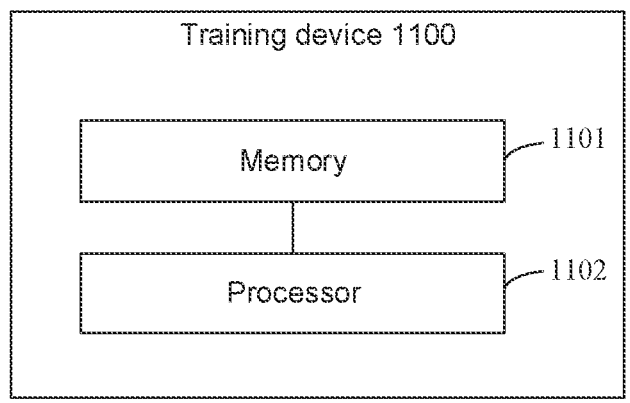
FIG. 11 is a structural diagram of another training device, in accordance with some embodiments.

Some other embodiments of the present disclosure provide a training device. As shown in FIG. 11, the training device 1100 includes a memory 1101 and a processor 1102. The memory 1101 is coupled to the processor 1102. The memory 1101 is used to store computer program code, and the computer program code includes computer instructions. When the processor 1102 executes the computer instructions, the computer instructions cause the training device 1100 to execute all steps performed by the training device in the method process shown in the above method embodiments.

Figure 12:
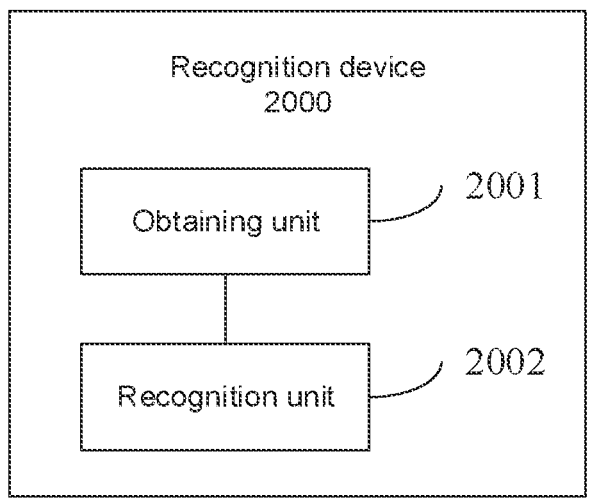
FIG. 12 is a structural diagram of a recognition device, in accordance with some embodiments.

Some embodiments of the present disclosure provide a recognition device, and as shown in FIG. 12, the recognition device 2000 includes an obtaining unit 2001 and a recognition unit 2002.

The obtaining unit 2001 is used to obtain a pedestrian image to be recognized.

The recognition unit 2002 is used to input the pedestrian image to be recognized into the pedestrian attribute recognition system, so as to obtain recognition results of the pedestrian image to be recognized. The pedestrian attribute recognition system is any pedestrian attribute recognition system provided in the above embodiments.

Figure 13:
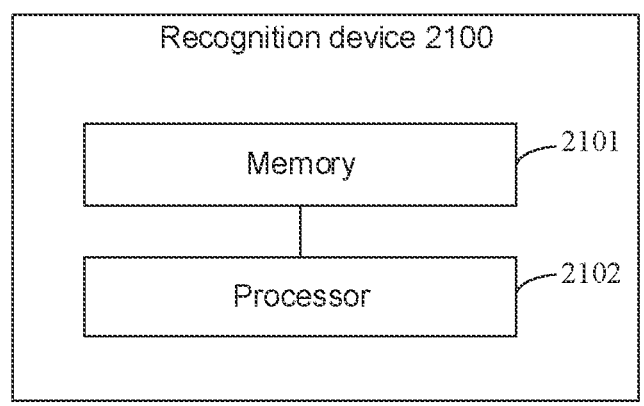
FIG. 13 is a structural diagram of another recognition device, in accordance with some embodiments.

Some other embodiments of the present disclosure provide a recognition device. As shown in FIG. 13, the recognition device 2100 includes a memory 2101 and a processor 2102. The memory 2101 is coupled to the processor 2102. The memory 2101 is used to store computer program code, and the computer program code includes computer instructions. When the processor 2102 executes the computer instructions, the computer instructions cause the recognition device 2100 to execute all steps performed by the recognition device in the method process shown in the above method embodiments.

Some embodiments of the present disclosure provide a computer-readable storage medium (e.g., a non-transitory computer-readable storage medium). The computer-readable storage medium has stored a computer program. The computer program, when run on a processor, causes the processor to perform one or more steps of the training method as described in the above method embodiments; or the computer program, when run on the processor, causes the processor to perform one or more steps of the recognition method as described in the above method embodiments.

For example, the computer-readable storage medium may include, but is not limited to, a magnetic storage device (e.g., a hard disk, a floppy disk or a magnetic tape), an optical disk (e.g., a compact disk (CD), a digital versatile disk (DVD)), a smart card or a flash memory device (e.g., an erasable programmable read-only memory (EPROM), a card, a stick or a key driver). Various computer-readable storage media described in the embodiments of the present disclosure may represent one or more devices and/or other machine-readable storage media, which are used to store information. The term "machine-readable storage media" may include, but is not limited to, wireless channels and various other media capable of storing, containing and/or carrying instructions and/or data.

Some embodiments of the present disclosure provide a computer program product. The computer program product includes computer programs that, when executed on the training device, causes the processor to perform one or more steps of the training method as described in the above method embodiments; or computer program that, when executed on the recognition device, causes the processor to perform one or more steps of the recognition method as described in the above method embodiments.

Beneficial effects of the pedestrian attribute recognition system, the computer-readable storage media, the computer program product and the computer programs are the same as the beneficial effects of the pedestrian attribute recognition method as described in some embodiments described above, and details will not be repeated here.

The foregoing descriptions are merely specific implementation manners of the present disclosure, but the protection scope of the present disclosure is not limited thereto. Changes or replacements that any person skilled in the art could readily conceive of within the technical scope of the present disclosure shall all be included in the protection scope of the present disclosure. Therefore, the protection scope of the present disclosure shall be subject to the protection scope of the claims.

What is claimed is:

1. A pedestrian attribute recognition method based on a pedestrian attribute recognition system, wherein the system includes at least one attribute localization module, each attribute localization module corresponds to a plurality of pedestrian attributes; and the attribute localization module includes a spatial transformation unit and an attribute recognition unit; the method comprises:
   extracting, by the spatial transformation unit, feature information in a discriminable region from feature information input into the spatial transformation unit, wherein the discriminable region is related to the plurality of pedestrian attributes corresponding to the attribute localization module; and
   outputting, by the attribute recognition unit, recognition results of the plurality of pedestrian attributes corresponding to the attribute localization module according to the feature information in the discriminable region;
   wherein extracting, by the spatial transformation unit, feature information in the discriminable region from the feature information input into the spatial transformation unit, includes:
   determining, by the spatial transformation unit, transformation parameters of the discriminable region according to the feature information input into the spatial transformation unit; and
   extracting, by the spatial transformation unit, the feature information in the discriminable region from the feature information input into the spatial transformation unit according to the transformation parameters of the discriminable region, wherein the transformation parameters include a scaling transformation parameter in a horizontal direction, a scaling transformation parameter in a vertical direction, a translation transformation parameter in the horizontal direction and a translation transformation parameter in the vertical direction.

2. The method according to claim 1, wherein the attribute localization module further includes a channel attention unit; the method further comprises:
   calibrating, by the channel attention unit, feature information input into the channel attention unit to obtain calibrated feature information, wherein the calibrated feature information is used as the feature information input into the spatial transformation unit.

3. The method according to claim 2, wherein calibrating, by the channel attention unit, the feature information input into the channel attention unit to obtain the calibrated feature information, includes:
   passing, by the channel attention unit, the feature information input into the channel attention unit through a global average pooling layer, a 1×1 convolutional layer, a rectified linear unit (ReLU) activation layer, another 1×1 convolutional layer and a sigmoid activation layer sequentially to obtain a first calibration vector;
   multiplying, by the channel attention unit, the first calibration vector and the feature information input into the channel attention unit channel by channel to obtain a second calibration vector; and
   adding, by the channel attention unit, the second calibration vector and the feature information input into the channel attention unit element by element to obtain the calibrated feature information.

4. The method according to claim 1, wherein the at least one attribute localization module includes a first attribute localization module and a second attribute localization module; the method further comprises:
   recognizing, by the first attribute localization module, pedestrian attributes related to human body parts; and
   recognizing, by the second attribute localization module, pedestrian attributes related to an entire human body.

5. The method according to claim 1, wherein the pedestrian attribute recognition system further includes a feature extraction module, the feature extraction module includes P feature extraction layers, where P is an integer greater than 1; the method further comprises:
   passing, by the feature extraction module, a pedestrian image through the P feature extraction layers sequentially to extract P pieces of feature information at different levels, wherein a single piece of feature information corresponds to one feature extraction layer, and the feature information input into the spatial transformation unit is from a piece of feature information extracted by the feature extraction module.

6. A method for training a pedestrian attribute recognition system, comprising:
   obtaining a training sample set including a plurality of sample pedestrian images, wherein each sample pedestrian image has a corresponding attribute tag, and the attribute tag is used to indicate a pedestrian attribute existing in a corresponding sample pedestrian image; and
   training the pedestrian attribute recognition system according to the training sample set, so as to obtain a trained pedestrian attribute recognition system;
   wherein the trained pedestrian attribute recognition system is the pedestrian attribute recognition system applied to claim 1.

7. A training device, comprising a memory and a processor, wherein the memory is coupled to the processor; the memory is used to store computer program code, and the computer program code includes computer instructions;
   when the processor executes the computer instructions, the computer instructions cause the training device to perform the training method according to claim 6.

8. A non-transitory computer-readable storage medium having stored a computer program, wherein when run on a training device, the computer program causes the training device to perform the training method according to claim 6.

9. A recognition device, comprising a memory and a processor, wherein the memory is coupled to the processor; the memory is used to store computer program code, and the computer program code includes computer instructions;
when the processor executes the computer instructions, the computer instructions cause the recognition device to perform the pedestrian attribute recognition method according to claim 1.

10. A non-transitory computer-readable storage medium having stored a computer program, wherein when run on a recognition device, the computer program causes the recognition device to perform the pedestrian attribute recognition method according to claim 1.

11. A pedestrian attribute recognition method based on a pedestrian attribute recognition system, wherein the system includes at least one attribute localization module, each attribute localization module corresponds to a plurality of pedestrian attributes; and the attribute localization module includes a spatial transformation unit and an attribute recognition unit; the method comprises:
extracting, by the spatial transformation unit, feature information in a discriminable region from feature information input into the spatial transformation unit, wherein the discriminable region is related to the plurality of pedestrian attributes corresponding to the attribute localization module; and
outputting, by the attribute recognition unit, recognition results of the plurality of pedestrian attributes corresponding to the attribute localization module according to the feature information in the discriminable region;
wherein the at least one attribute localization module includes a first attribute localization module and a second attribute localization module; the method further comprises:
recognizing, by the first attribute localization module, pedestrian attributes related to human body parts; and
recognizing, by the second attribute localization module, pedestrian attributes related to an entire human body.

12. The method according to claim 11, wherein the first attribute localization module includes one or more of a head attribute localization module, an upper body attribute localization module or a lower body attribute localization module; recognizing, by the first attribute localization module, the pedestrian attributes related to the human body parts, includes:
recognizing, by the head attribute localization module, pedestrian attributes related to a head of the human body; recognizing, by the upper body attribute localization module, pedestrian attributes related to an upper body of the human body, and recognizing, by the lower body attribute localization module, pedestrian attributes related to a lower body of the human body.

13. A pedestrian attribute recognition method based on a pedestrian attribute recognition system, wherein the system includes at least one attribute localization module, each attribute localization module corresponds to a plurality of pedestrian attributes; and the attribute localization module includes a spatial transformation unit and an attribute recognition unit; the method comprises:
extracting, by the spatial transformation unit, feature information in a discriminable region from feature information input into the spatial transformation unit, wherein the discriminable region is related to the plurality of pedestrian attributes corresponding to the attribute localization module; and
outputting, by the attribute recognition unit, recognition results of the plurality of pedestrian attributes corresponding to the attribute localization module according to the feature information in the discriminable region;
wherein the pedestrian attribute recognition system further includes a feature extraction module, the feature extraction module includes P feature extraction layers, where P is an integer greater than 1; the method further comprises:
passing, by the feature extraction module, a pedestrian image through the P feature extraction layers sequentially to extract P pieces of feature information at different levels, wherein a single piece of feature information corresponds to one feature extraction layer, and the feature information input into the spatial transformation unit is from a piece of feature information extracted by the feature extraction module.

14. The method according to claim 13, wherein the pedestrian attribute recognition system further includes a feature fusion module; the method further comprises:
performing, by the feature fusion module, a fusion processing on the P pieces of feature information at different levels extracted by the feature extraction module to obtain P pieces of fusion-processed feature information, wherein the feature information input into the spatial transformation unit is from a piece of fusion-processed feature information output by the feature fusion module.

15. The method according to claim 14, wherein the at least one attribute localization module includes a plurality of attribute localization modules, the plurality of attribute localization modules are divided into P groups of attribute localization modules; and each group of attribute localization modules includes K attribute localization modules, where K is an integer greater than 1 and less than M and M is an integer greater than 1;
a group of attribute localization modules corresponds to one piece of fusion-processed feature information; the method further comprises:
outputting, by the group of attribute localization modules, a first pedestrian attribute prediction vector according to the corresponding piece of fusion-processed feature information, the first pedestrian attribute prediction vector including recognition results of M pedestrian attributes.

16. The method according to claim 15, wherein the pedestrian attribute recognition system further includes a feature recognition module; the method further comprises:
outputting, by the feature recognition module, a second pedestrian attribute prediction vector according to a piece of feature information at a highest level extracted by the feature extraction module, the second pedestrian attribute prediction vector including recognition results of the M pedestrian attributes.

17. The method according to claim 16, wherein the pedestrian attribute recognition system further includes a result output module; the method further comprises:
outputting, by the result output module, final recognition results of the M pedestrian attributes according to first pedestrian attribute prediction vectors output by the P groups of attribute localization modules and the second pedestrian attribute prediction vector output by the feature recognition module.

18. The method according to claim 17, wherein the final recognition results of the M pedestrian attributes are final predicted probability values of the M pedestrian attributes.

19. The method according to claim 17, wherein the final recognition results of the M pedestrian attributes are final tag values of the M pedestrian attributes.

* * * * *